Patented Mar. 31, 1931

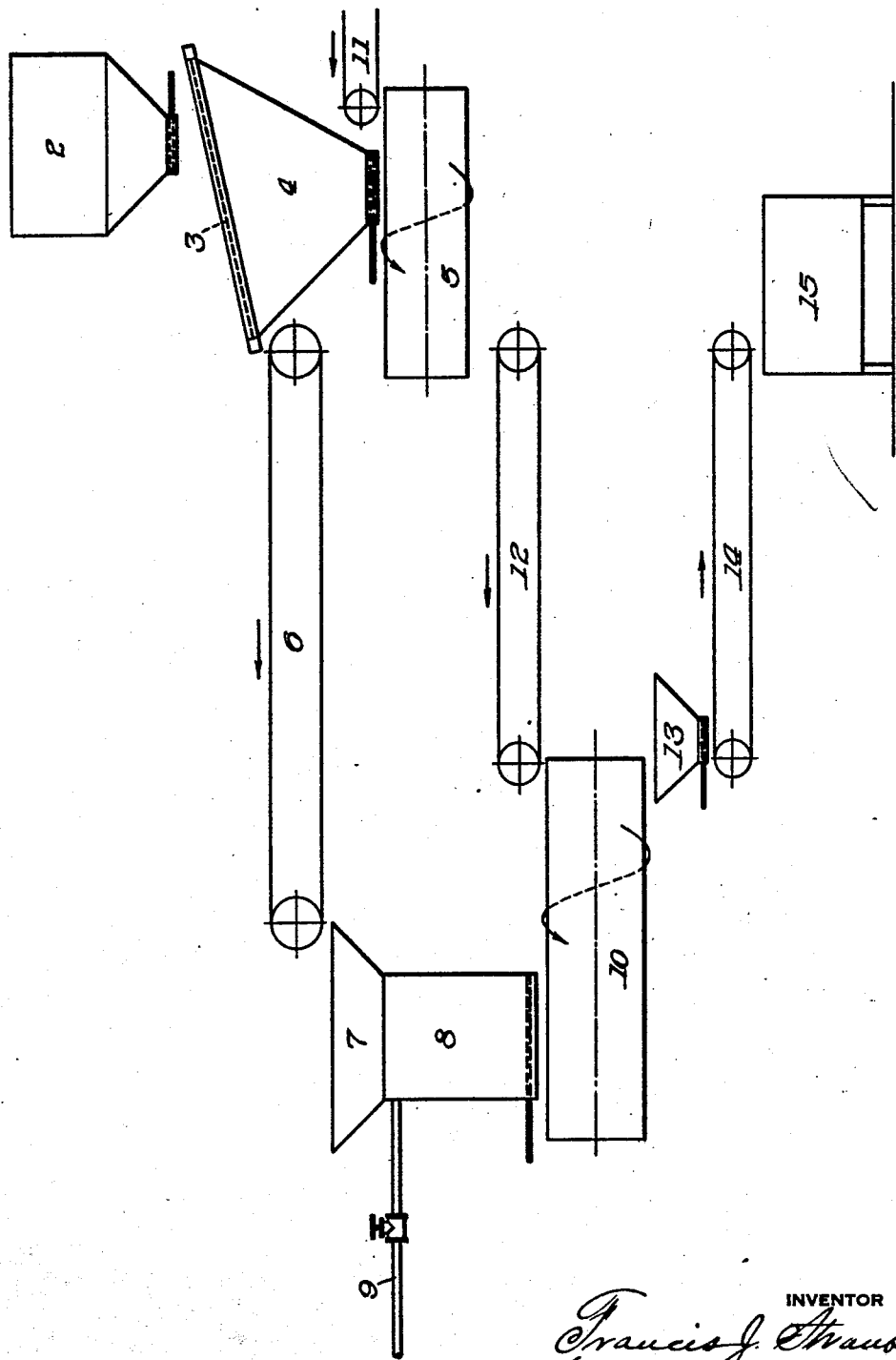
March 31, 1931.     F. J. STRAUB     1,798,505
BUILDING BLOCK AND METHOD OF MAKING THE SAME
Filed March 18, 1929

1,798,505

UNITED STATES PATENT OFFICE

FRANCIS J. STRAUB, OF NEW KENSINGTON, PENNSYLVANIA

BUILDING BLOCK AND METHOD OF MAKING THE SAME

Application filed March 18, 1929. Serial No. 347,791.

My invention refers to an improvement in the art of manufacturing building block, brick, or similar units of a variable size aggregate of suitable consistency, water, and cement. The invention consists in the process or method hereinafter described, and in the resulting product thereof.

The method refers particularly to the making of such building units from a raw material such as cinder and ashes, or other suitable material in which the larger particles are of a porous or cellular structure, and the smaller particles or fines are of the nature of fine ashes or dust.

In the manufacture of the so-called cinder concrete blocks, such as disclosed in my prior Patent No. 1,212,840, the aggregate is made of cinders and ashes, cement and water with a maximum size of cinder or clinker of say not more than three quarters inch maximum diameter. Such pieces and smaller pieces of cinder of various maximum and intermediate sizes are ordinarily of a porous cellular structure and are combined with the fines and cement and water by mixing the entire mass in a batch mixer or the like for thorough and complete intermingling of all of the several parts and ingredients, prior to forming the block in a tamping mold or the like, after which it is ejected and dried by natural evaporation.

In such treatment, it is necessary to subject the whole mass to a mixing action for a considerable period of time, say six to eight minutes, in order to thoroughly impregnate the larger particles with the water invested cement and fines, which become incorporated with the porous structure of the larger pieces for proper binding action of the cementitious element.

In such treatment it is necessary to use a sufficient proportion of cement with the fines and water so that the entire body portion of the larger and intermediate cellular units of the mass may become thoroughly invested throughout their entire body portion.

I have discovered that in making such blocks of the necessary strength and resistance, the holding action of the fluid cementitious mass of binder and fines is amply sufficient where the outer or surface portions only of the larger and intermediate cinder units are in binding or anchoring connection with the smaller particles and the fines and cement. Also that if the interior portions of such larger and intermediate units may be left unpenetrated thereby, the resulting finished block is amply strong and with additional qualities of interior open cellular structure, increased qualities of permeability and nailability, and with attendant advantages as to insulation, lightness, etc., and with a material saving of cement and in time of manufacture.

This result is accomplished by first impregnating or soaking the larger and intermediate size units, as cinders etc., with water to their limit of absorption or saturation, prior to mixing them with the binder, as cement, and the remainder of the mass in the form of ashes or fines. There is also the further resulting advantage and saving in time arising from the operation of first mixing the smaller particles and fines and cement in a dry condition.

Thereafter, upon bringing such previously mixed dry fines and cement together with the water soaked or water logged larger pieces in a complete batch, in a batch mixer, the water in suspension in such major coarser portion of the entire batch will be radiated through such finer portions by absorption. The pre-invested water in the coarser pieces thus provides ample fluidity to accomplish the final combination and setting of the cement and impregnation thereof with the fines through the outer pores of the larger and intermediate pieces. This effect is produced by first separating the larger and intermediate pieces of an entire mass by any suitable means, as a screen, and then subjecting them to thorough water soaking sufficiently long to effect complete saturation.

The smaller particles and fines, say anything under one-quarter inch, are then mixed in dry condition with a suitable proportion of proper binder, as Portland cement, after which the previously treated water-saturated portion of the mass and the cement-invested smaller dry portion of the mass are brought together in a common batch mixer and therein thoroughly mixed.

Thereafter, suitable portions of such batch are withdrawn and subjected to the usual treatment in a tamping press mold or the like, for formation of the block in the usual manner.

I have shown in the drawing, Fig. 1, a diagrammatic representation of means adapted to effect such treatment, it being understood that such mechanism is illustrative only and may be varied in its elements, detail construction or otherwise, to carry out the several steps of the invention for producing the resulting product.

In describing such steps, it will be understood also that quantities and proportions are entirely arbitrary and may also be varied from as desired, dependent on the particular aggregate being used, or other conditions.

Referring to the drawing, 2 represents a hopper or other suitable vessel containing a mass of suitable aggregate, as cinders and ashes, which, due to a previous crushing operation or in its natural condition, contains no pieces of larger size than say three quarter inch diameter. The aggregate from such vessel is separated, as by a screen 3, so that the smaller particles and fines, say under one quarter inch, pass by any suitable means, as through a hopper 4 to a dry mixer 5. The larger portions, i. e. all over one-quarter inch size, pass from screen 3 by any suitable means, as a conveyor 6 and hopper 7, to a water soaking or saturating vessel 8 of any suitable construction, having a water supply as by pipe 9, in which vessel 8 the said cinders are thoroughly soaked.

The mass of larger units is subjected to such water absorption treatment sufficiently long to thoroughly fill them with their maximum possible content of water, any excess or unabsorbed water being drained off.

The thus treated cinders or coarser pieces thus completely invested with water are then discharged from vessel 8 by any suitable means into a batch mixer 10, provided with rotatable paddles or the like, as is commonly practiced in any standard batch mixer.

A suitable amount or proportion of binder, as Portland cement, is added to the small and fine cinders and ashes in the dry mixer 5 by any suitable means, as conveyor 11, and is thoroughly mixed with the finer cinders and ashes in the dry mixer. For illustration, assuming that say seven cubic feet of the entire cinder and ash mass is discharged from hopper 2 and that say a total of six cubic feet of the larger and intermediate sizes pass to the water saturating vessel 8, the remaining one cubic foot of ashes and fines is deposited in dry mixer 5. A suitable amount, say one cubic foot of cement is also delivered from the conveyor 11, after which the dry fines and cement are thoroughly mixed together for a period of say one minute.

Thereafter, such dry mixture of fines and cement is delivered by any suitable means, as a conveyor 12, to the mixer 10, where the entire ingredients, i. e. water soaked cinders and dry fines and cement, are thoroughly mixed together for a short period, say two minutes. Due to the dry character and small amount of the material in mixer 5, it may be operated at a comparatively high speed, as say 200 R. P. M. Mixer 10, due to the waterlogged aggregate and large bulk, should be operated at a much reduced speed, say 35 R. P. M.

Thus, an entire mixing period for complete mixing of the entire batch does not necessarily exceed three minutes, as compared to the present time necessary to mix under the present practice of say five to eight minutes.

Such reduction in the time of mixing not only effects great economy in time alone, but also accomplishes a very material saving in wear and tear, especially in the mixer 10.

Due to the fact that the larger particles being mixed in such mixer are already completely invested with water, they will impart amply sufficient moisture to the previously mixed fines and cement, to effect proper saturation and resulting setting and integration of the several particles throughout the entire mass.

A further advantage in such treatment is that the resulting mixture, which may be discharged from mixer 10 through any suitable means, as hopper 13 and conveyor 14 to the tamping press or other block forming element 15, is in the form of an apparent or so-called "dry mix".

Such dry mix is much more readily subjected to the tamping and pressing operation in press 15 than is a very fluid or wet mix, and more easily and freely accommodates itself to the interior of the mold and into the corners thereof and around the cores, than does a very wet mix which tends to clog and impede such complete filling, due to balling up or sticking, etc.

A so-called dry mixture is also more easily handled on a belt conveyor, and a further advantage of importance is that a maximum bulk of any given portion of the entire mass is more nearly retained because of the short time necessary to sufficiently impregnate it with the binder. In all very fluid mixtures, the longer they are mixed the smaller they tend to become in bulk.

In the treatment of the aggregate as above described, and due to the comparatively short exposure of the larger and intermediate cinder particles, and because of the giving out of the water content of such larger particles, the binder effects, with the fines, a holding connection and impregnation with the outer cellular portions of the cinders only, leaving their interiors uncongested with the binder, as is the case in the usual wet mixture above described.

Due to such condition, the absorption of the water by the dry cement and fines from the larger cellular units which begins in the batch mixer 10, is gradually continued after the building block or unit is formed in the press and is laid up on the racks for drying. Ordinarily, by the old method, it was frequently necessary to subject such formed blocks to steam or other moistening operation to supplement the radiated moisture tending to too rapid natural drying.

By my improved method the limited moisture first immediately absorbed by the binder and fines in the second mixing stage, is continuously supplemented until all of the moisture has been absorbed from the interior pores or cells of the larger cinders, tending to a more gradual and continuous water supply just as required by the cement and resulting in a more perfect resulting concrete body in the finally dried article.

The complete cinder block resulting from the above described operation therefore retains all of the valuable qualities of the usual well known cinder block made in the ordinary manner, with the additional advantage of a material saving in the necessary proportion of cement. There is effected a greater porosity with an open cellular structure in the middle portions of the larger aggregate elements, and with maintainance of all of the valuable and useful qualities, with a material reduction in weight.

In cases where the cinder aggregate may be already wet or water soaked, the finer portions and ashes may be first separated by screening and then dried, for treatment and mixture with the cement as described, while the larger particles may be charged into the vessel 8 or the final mixer 10 therewith, either with or without supplemental water. Also, the whole bulk may be used, by simply adding the dry mixed cement, sand, slag, etc., to the already wet cinder.

While good results may be secured by the use of coal cinders and ashes, it will be understood that the method may be also utilized in connection with any other sufficiently porous or cellular material, such as "haydite", which is a burned clay clinker, slag, or any other sufficently porous or cellular aggregate capable of subjection to the same treatment.

In case of insufficient proportion of ashes or fines, or in substitution thereof, any other suitable fines may be used in the dry mixture with the cement, as fine dry limestone screenings, sand, slag, etc., with equally good results. In some cases, dependent on the conditions, proportions and quality of the original mass of cinders and ashes, and where such entire mass is already water soaked, the dry mixture of cement and such additional fines may be added thereto without previous separation, with good results.

The advantages of my improved method of manufacturing cinder concrete or other suitable aggregate and concrete building blocks, bricks, slabs, etc., will be readily understood and appreciated by all those familiar with the art. It not only effects a material saving in time of operation and in the wear and tear on machinery, but also in the percentage of cement while resulting in a more perfect, regular and lighter output with the other advantages noted.

It may be utilized in connection with any suitable machines or apparatus for the manufacture of building units of any suitable size or shape, and may be varied from in different respects or details by the user, but all such changes are to be understood as within the scope of the following claims.

What I claim is:

1. The herein described process of making building blocks and the like consisting in first separating from an original mass of cellular coal cinder aggregate the smaller partices and fines, mixing therewith while dry a suitable binder, water soaking the remainder composed of the larger pieces, and then mixing the whole together in preparation for molding the same in block form.

2. The herein described process of making building blocks and the like consisting in first separating from an original mass of cellular aggregate the smaller particles and fines, mixing therewith while dry a suitable binder, water soaking the remainder, and then mixing the whole together with complete wetting of the entire mass by absorption from such remainder in preparation for molding the same in block form.

3. The herein described process of making building blocks and the like consisting in the following steps; first separating the smaller particles and fines from a mass of suitable material including a portion of larger porous and cellular units, then mixing in dry condition such smaller particles and fines with a suitable binder, then while invested with water combining the remaining portion of larger particles with such mixture and mixing the whole together in preparation for molding the same in block form.

4. The herein described process of making building blocks and the like consisting in first separating the coarser porous portions of a mass of suitable aggregate from the finer portions, investing the coarser portions with water, mixing the finer dry portions with a dry binder, and then combining and mixing the same together as an aggregate in preparation for molding in block form.

5. The herein described process of making building blocks and the like consisting in first separating the coarser porous portions of a mass of suitable aggregate from the finer porous portions, investing the coarser porous portions with water, mixing the finer portions with a binder and additional fines while dry, and then combining and mixing the same together as an aggregate in preparation for molding in block form.

6. The herein described process of making building blocks and the like consisting in first separating the coarser portions of a mass of coal cinders and ashes from the finer portions, investing the coarser portions with water, mixing the finer dry portions with dry cement, and then combining and mixing the same together as an aggregate in preparation for molding into block form.

In testimony whereof I hereunto affix my signature.

FRANCIS J. STRAUB.